(12) United States Patent
Hakimi et al.

(10) Patent No.: US 10,235,292 B2
(45) Date of Patent: Mar. 19, 2019

(54) METHOD AND SYSTEM FOR IMPLEMENTING LOCK FREE SHARED MEMORY WITH SINGLE WRITER AND MULTIPLE READERS

(71) Applicant: Dell Products L.P., Round Rock, TX (US)

(72) Inventors: Michael Hakimi, Bat Yam (IL); Max Shifrin, Petah Tiqwa (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/134,537

(22) Filed: Apr. 21, 2016

(65) Prior Publication Data

US 2017/0308466 A1    Oct. 26, 2017

(51) Int. Cl.
| | | |
|---|---|---|
| G06F 12/08 | (2016.01) | |
| G06F 9/52 | (2006.01) | |
| G06F 12/084 | (2016.01) | |
| G06F 12/0804 | (2016.01) | |
| G06F 12/0864 | (2016.01) | |
| G06F 12/0842 | (2016.01) | |

(52) U.S. Cl.
CPC ........ *G06F 12/084* (2013.01); *G06F 12/0804* (2013.01); *G06F 12/0842* (2013.01); *G06F 12/0864* (2013.01); *G06F 9/526* (2013.01); *G06F 2205/123* (2013.01); *G06F 2209/521* (2013.01); *G06F 2212/1024* (2013.01); *G06F 2212/6042* (2013.01)

(58) Field of Classification Search
CPC .............. G06F 12/084; G06F 12/0864; G06F 2212/6042; G06F 2205/123; G06F 2209/521; G06F 9/526
See application file for complete search history.

(56) References Cited

U.S. PATENT DOCUMENTS

| | | | |
|---|---|---|---|
| 7,330,956 B1 * | 2/2008 | McClure ............... | G06F 9/5016 711/171 |
| 9,003,131 B1 * | 4/2015 | Lunev .................. | G06F 3/0668 711/147 |

(Continued)

FOREIGN PATENT DOCUMENTS

JP    2008027450 A  *  2/2008  ......... G06F 12/0802

*Primary Examiner* — Ann J Lo
*Assistant Examiner* — Masud K Khan
(74) *Attorney, Agent, or Firm* — Pearl Cohen Zedek Latzer Baratz LLP (57) ABSTRACT

A method and a system for implementing a lock-free shared memory accessible by a plurality of readers and a single writer are provided herein. The method including: maintaining a memory accessible by the readers and the writer, wherein the memory is a hash table having at least one linked list of buckets, each bucket in the linked list having: a bucket ID, a pointer to an object, and a pointer to another bucket; calculating a pointer to one bucket of the linked list of buckets based on a hash function in response to a read request by any of the readers; and traversing the linked list of buckets, to read a series of objects corresponding with the traversed buckets, while checking that the writer has not: added, amended, or deleted objects pointed to by any of said traversed buckets, wherein said checking is carried out in a single atomic action.

17 Claims, 4 Drawing Sheets

(56) References Cited

U.S. PATENT DOCUMENTS

| | | | | |
|---|---|---|---|---|
| 2001/0037475 | A1* | 11/2001 | Bradshaw | G06F 8/71 |
| | | | | 711/118 |
| 2004/0107227 | A1* | 6/2004 | Michael | G06F 9/5016 |
| 2012/0066192 | A1* | 3/2012 | Hepkin | G06F 17/30348 |
| | | | | 707/704 |
| 2013/0152053 | A1* | 6/2013 | Cui | G06F 11/3672 |
| | | | | 717/127 |
| 2014/0337593 | A1* | 11/2014 | Holbrook | G06F 3/0614 |
| | | | | 711/162 |

* cited by examiner

METHOD AND SYSTEM FOR IMPLEMENTING LOCK FREE SHARED MEMORY WITH SINGLE WRITER AND MULTIPLE READERS

FIELD OF THE INVENTION

The present invention relates generally to the field of managing a cache memory, and more particularly a cache memory shared by multiple readers.

BACKGROUND OF THE INVENTION

In a typical scenario, a plurality of services running on a server node may need to be able to access to the cache memory at the same time. A fundamental requirement of the server node is that it should always read a consistent snapshot taken of the data on the machine or server node. A further requirement is that the data on the cache may be efficiently refreshed which means that once an object was accessed, any further access to that object may not require searching for it again. In terms of complexity, this means that once an object is retrieved, further accesses are in the order of O(1).

In a case that the cache memory is to be shared (instead of having a separate cache for each service which is inefficient), it is desirable to resolve any potential conflict between operations. Specifically, if one service writes to a specific address on the shared cache, another service cannot read the data as it is being changed and by the end of the read operation, some of the data is no longer valid due to the simultaneous write operation by different service.

A solution known in the art for the aforementioned condition, is to resolve conflicting operations on a shared resource is the use of a lock (also known as mutex) that prevents one service from accessing the shared resource (e.g. cache) whenever another service is already accessing it. Thus the operations of the services over the shared cache are mutually exclusive. Locks affect the performance of the system and may increase latency and may sometimes lead to starvation of some services.

While some lock-free mechanisms are known in the art relating to several types of resources, none of the existing technologies known in the industry or academia suggests a lock free shared memory between processes (as opposed to shared memory between threads).

SUMMARY OF THE INVENTION

Some embodiments of the present invention implement a memory shared by several processes. Several design limitations may be involved in order to accomplish this as follows:
  Access to data cannot be carried out via pointers but rather via offsets;
  Shared memory has a static size and once allocated it cannot be adjusted; and
  The memory in the shared memory is being reused. This is due to the fact that shared memory cannot be re-allocated, memory which was freed may be re-used (otherwise the memory may ran out very fast).

Some embodiments of the present invention provide a mechanism for implementing a lock-free shared memory for multiple readers and a single writer. The system may include a plurality of readers and a single writer, wherein the readers and the writer are services running on a computer processor; and a memory accessible by a plurality of the readers and the single writer, wherein the memory may be a hash table having at least one linked list of buckets, each bucket in the linked list having: a bucket ID, a pointer to an object, and a pointer to another bucket on the linked list of buckets.

According to some embodiments of the present invention, in response to a read request by any of the plurality of readers, the computer processor may be configured to: calculate a pointer to one bucket of the linked list of buckets based on a hash function, and traverse the linked list of buckets, to read a series of objects corresponding with the traversed buckets, while checking that the writer has not: added, amended, or deleted objects pointed to by any of said traversed buckets, wherein said checking is carried out in a single atomic action.

According to some embodiments of the present invention, the checking may be carried out by examining the pointer to the other bucket (i.e., the 'next bucket') which includes an ID of other bucket and a pointer to the other bucket.

According to some embodiments of the present invention, the checking may be carried out by examining the object pointer which includes a data pointer and a data version, wherein the checking of the data version is carried out prior to retrieving the object data and right after retrieving the object data.

According to some embodiments of the present invention, a number of buckets may be limited to a maximal number of objects capable of being stored on the shared memory.

According to some embodiments of the present invention, in response to a request by the single writer to add a new object, the computer processor may be configured to: allocate space for object data of the new object on the shared memory; update data version of the new object; allocate a new bucket to point the new object; and update the pointer to another bucket on the bucket that points to the bucket allocated for the new object, wherein the update is carried out in a single atomic action.

According to some embodiments of the present invention, in response to a request by the single writer to modify an object, the computer processor may be configured to: allocate space for object data of the modified object on the shared memory; update data version of the modified object; and update the object pointer on the bucket associated with the modified object, wherein the update is carried out in a single atomic action.

According to some embodiments of the present invention, in response to a request by the single writer to delete an object, the computer processor may be configured to: indicate object data of the object to be deleted as invalid; free space associated with the object to be deleted on the shared memory; and update the pointer to another bucket on the bucket that points to the bucket associated with the object to be deleted, to a pointer to a child bucket of the bucket of the object to be deleted, wherein the update is carried out in a single atomic action.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It may be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention may be described. For purposes of explanation, specific configurations and details are set forth in order to provide a thorough understanding of the present invention. However, it may also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Figure 1:
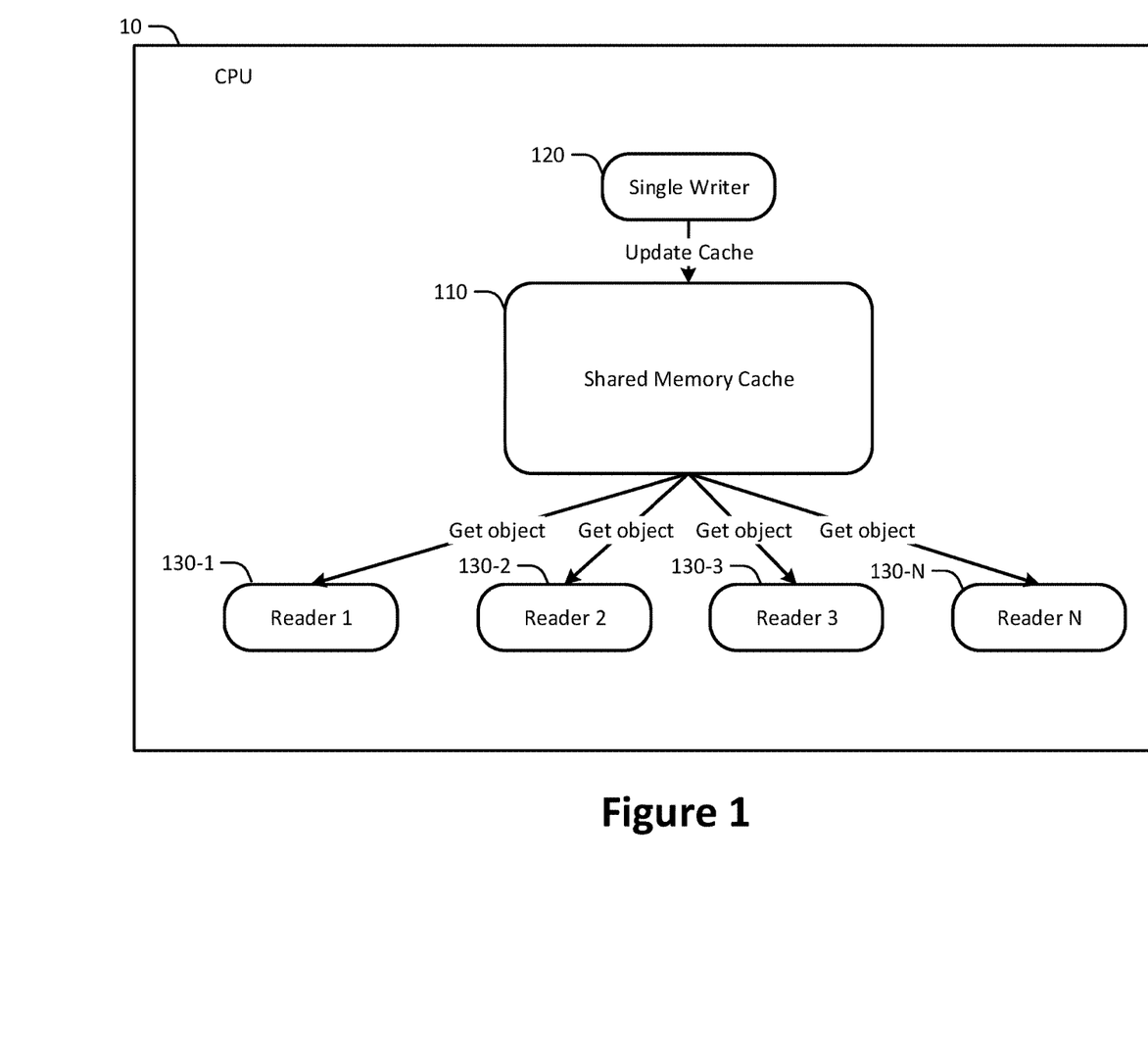
FIG. 1 is a block diagram illustrating a high level block diagram of a system in accordance with some embodiments of the present invention.

FIG. 1 is a block diagram illustrating a block diagram of a system in accordance with some embodiments of the present invention. The system includes a shared memory (such as cache) accessible by a single writer 120 and a plurality of readers 130-1 to 130-N, all being services executed by a computer processor unit (CPU) 10. In accordance with some embodiments of the present invention the unique architecture and logic as may be detailed herein enable the simultaneous use of a shared memory cache of objects by various services on the server node, without employing a lock. Specifically, the proposed architecture supports single writer and multiple readers (each of which is a different process) accessing a shared cache.

Figure 2:
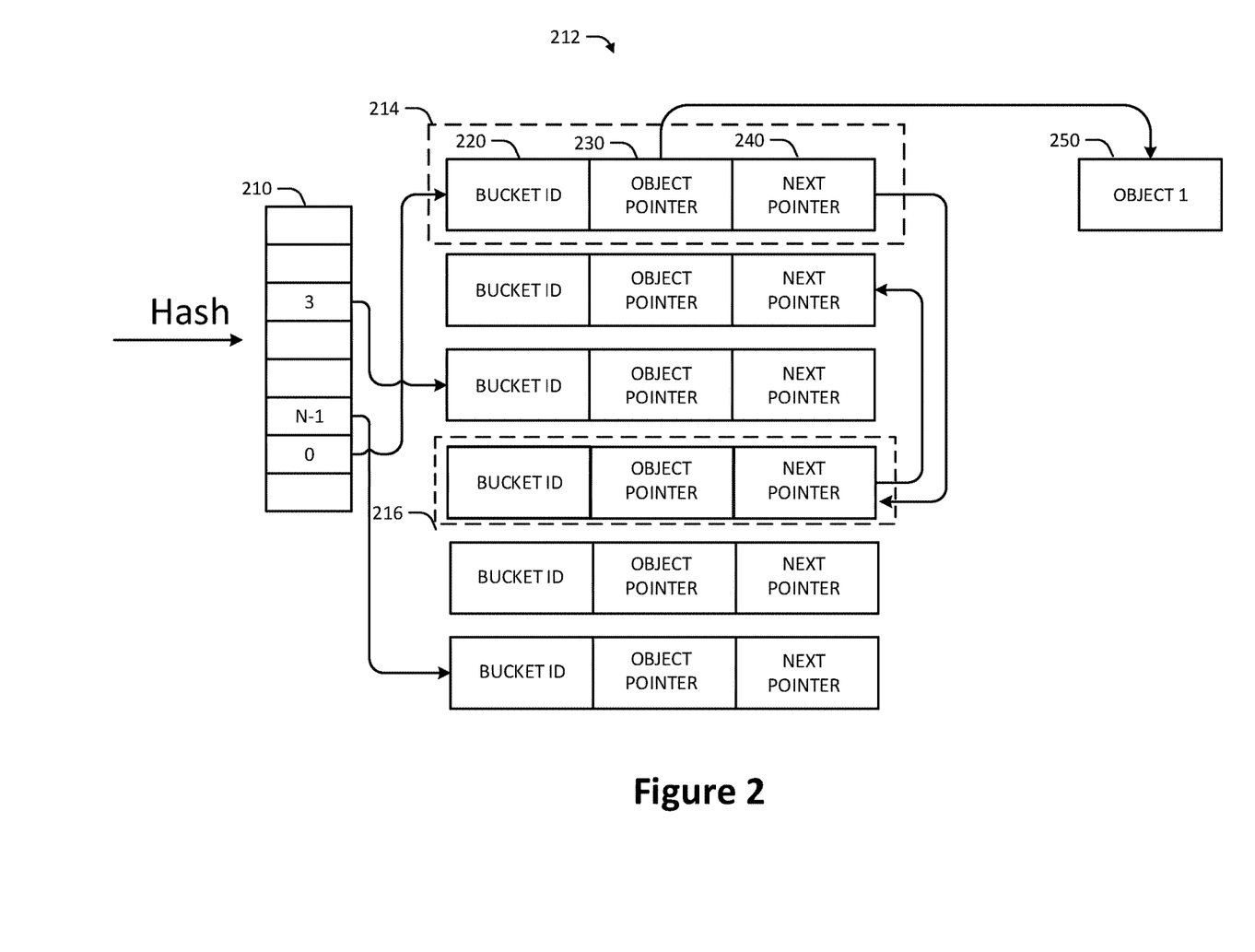
FIG. 2 is a block diagram illustrating an exemplary architecture of a data structure for a shared memory in accordance with embodiments of the present invention.

FIG. 2 is a block diagram illustrating an exemplary architecture of a data structure for a shared memory in accordance with embodiments of the present invention. The architecture of the shared memory includes a hash table 210 that is mapped to a linked list of buckets such as buckets such as 214 each pointing to a respective object (e.g. object 1 250) and also pointing to another bucket (e.g., 216) being a 'child' or 'next' bucket thus creating a linked list of buckets 212. The object data of each object stores metadata relating to the data of the object such as size, version and validity. The offsets are the results of applying the hash table 210 and point to the buckets.

As may be explained below, the use of a linked list of buckets as intermediate data structure between the hash table and the objects provides the system with required metadata such as the validity and the freshness of the data on the pointed objects. It enables to implement an offset based memory (relative rather than absolute) which is necessitated by the shared nature of the memory.

In some embodiments the memory is arranged as a linked list of buckets, each bucket having: a bucket ID, a pointer to an object, and a pointer to another bucket on the linked list of buckets, wherein in response to a read request by any of the plurality of readers, the computer processor is configured to: calculate a pointer to a bucket at the linked list of buckets, using a hash function, traverse the linked list of buckets for reading a series of objects, while checking that the writer has not: added, amended, or deleted objects pointed by any of said buckets, wherein said checking is carried out in a single atomic action.

Figure 3:
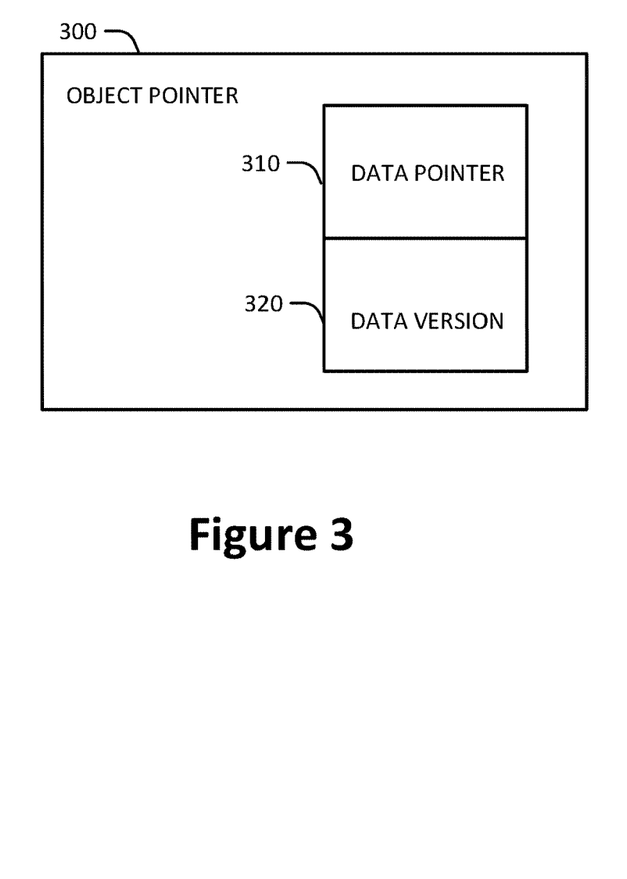
FIG. 3 is a diagram illustrating an aspect in accordance with embodiments of the present invention.

FIG. 3 illustrates the object pointer files as including two values being data pointer and a data version, so checking whether the writer has updated the objects can be done by looking at the data version prior to retrieving the object data and also right after retrieving the object data. This guarantees that no intervening write has occurred during object read.

Figure 4:
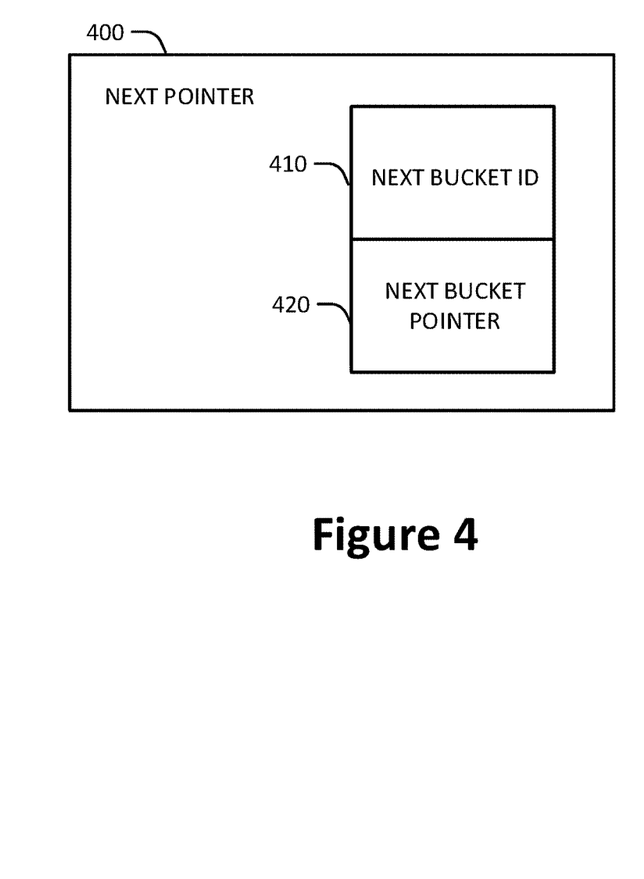
FIG. 4 is a diagram illustrating another aspect in accordance with embodiments of the present invention.

FIG. 4 illustrates the next bucket field 400 (referred herein also as "another bucket") which includes an ID of next bucket 410 and a pointer to the next bucket 420. Right after jumping from one bucket to another bucket while traversing the linked list of buckets, the bucket ID at a preceding bucket from ID of next bucket 420 is compared with the ID of the child bucket and if not the same—this is an indication of an interfering writer update and the read operation may be restarted.

Following is a detailed explanation of how all necessary operations are implemented over the suggested architecture.
The Single Writer The writer is the only service in the server which has permission to write to the shared memory region. The writer can modify, add or delete objects in the shared memory. Embodiments of the present invention does not support multiple writers.

Adding a New Object

When a new object is added by the writer, the writer first may allocates memory from the shared memory for the new object and copies the new data into the allocated memory at the shared memory space. The writer then updates the version of the data object on the object itself. The writer then gets a free bucket from the free bucket list which is a list of all buckets that are being re-used. In case there are no free buckets to be re-used, it gets a free bucket from the data pool which stored all the buckets once the system is initialized (it is noted that the number of buckets in the system is limited to the maximal number of objects that can be stored on the shared cache). The object pointer in the selected bucket is then set to point to the newly added object. Now the hash table may be updated.

In a case that the bucket entry is invalid, the new bucket next pointer may be set to NULL and the bucket entry may be set by a single atomic operation to point on the new bucket.

In a case that bucket entry is valid, the bucket may be added to the appropriate location in the list according to the object ID sorting order. The bucket may be added by setting the bucket's next pointer to its future successor. Then, in a single atomic action the predecessor next pointer may be set to point on the new bucket.

In both cases the single atomic operation causes the new bucket to be added to the list while keeping it valid for concurrent readers.

This way, a new bucket may be inserted into the linked list of buckets without interfering with the existing buckets. Finally, the valid flag may be set to 'true'. This action may be carried out last so if any read operation is carried out during the write operation, the system may detect it as invalid data and dump the data read so far.

Modifying an Existing Object

Whenever the data of an existing object is to be modified, the writer may allocate memory for the newly modified data from the data pool (again, if there is no space, an old object may be deleted). The modified data may then be copied to the allocated memory. Then new object data may be created (using some of the data of the old object) and the version number may be now updated to indicate that the data was modified. The valid flag on the object data of the new object may be changed into 'true'. Then, in a single atomic operation, the field in the bucket that points to the object data may be updated to point to the new object data. The old object data may be then freed into the data pool. Thus, in modifying an object, the bucket and its mapping on the hash table may be maintained, and only memory may be reallocated together with new object data fields that are created and linked to the bucket.

Deleting an Object

When deleting an object, the object data and the bucket may be freed but at the same time the linked list of buckets may be reconnected without the freed bucket. This may be carried out as follows: the object to be deleted, its bucket and the bucket pointing to the bucket pointing to the object to be deleted are found. The valid flag of the object to be remove may be set to 'false' (this may be carried out first so logically the object may be already deleted and any read operation may dump the data if read). The delete counter on the bucket may be incremented so the bucket may be also logically indicated as deleted. Then, the "next pointer" field of the predecessor bucket (bucket that pointed to the bucket pointing to the deleted object) may be changed to point the child bucket (bucket that was pointed by the bucket pointing to the deleted object). Finally, the object data is freed into the data pool and the deleted bucket may be moved to the free buckets list. It may be noted that the deleted buckets are stored on the free bucket list and are never returned to the data pool which only stores new buckets. The aforementioned flow enables reader to know early on the process that the data of the object to be deleted may be not valid anymore and further maintains the structure of the linked list of buckets without interfering with other objects.

Multiple Readers

First Access

On a first access, the reader may search for the object on the hash table and may copy the whole object to its local memory. The reader may also save on its local memory, a pointer to the bucket pointing to the object, the last delete counter of the aforementioned bucket as well as the last version field on the aforementioned bucket (relating to the object data).

When retrieving an object, the reader may perform a "safe walk" on the hash table as the writer might be modifying it at the same time. The reader first calculates the hash function and receives a pointer to the appropriate chain of buckets. The reader then starts to traverse the list while comparing its key with each one of the objects in the list. Objects maybe added or deleted at this time by the writer. As a result the reader might find itself traversing some other list which may be different than the list it had intended to traverse. In order to validate its traversal, the bucket next pointer encodes both the next bucket offset and the next bucket id. The reader reads this special pointer in a single atomic operation. Once it jumps to the next bucket, it validates that the bucket id may be the same as it read in the predecessor next pointer. In case this validation fails, the reader retries its operation by returning to the head of the list.

It should be noted that in order to detect bucket which was reused by the writer, the bucket delete counter (incremented when a bucket may be deleted) can be considered to be part of the bucket id. This way if a bucket was deleted and added again, it may have different id and the reader would be able to detect the modification.

When the reader reads an object, it may validate that it reads a valid snapshot of the object. This validation may be advisable as the writer might modify this object while the reader reads the data. In case the writer modifies the object, the old object data may be returned to the memory pool and at this point this memory can be reused. As a result the reader which reads this data may get corrupted data. In order to validate the data, the object pointer inside the bucket encodes both the offset to the data and the object version. The reader reads this special pointer in a single atomic operation before it reads the object data and after it reads the object data. The reader validates that the pointer hasn't changed while it reads the data. In case the reader detects the pointer has changed, it ignores the read data and retries to read it again.

Refresh (Repeated Read)

When reading an object the whole object may be copied with the current bucket ID to the local memory of the reader. In the first access the reader also stores a pointer to the bucket location in the shared memory in order to save another search in the hash table for future access.

On any subsequent access, the delete counter and the version field on the bucket are checked with the last stored delete counter and version (from previous read). If the version is the same, the object hasn't changed and the data may be simply copied from the local memory of the reader. If the version is different and the delete counters are the same, the modified object may be being copied. If the delete counters are different, the object may be retrieved again from the hash table.

Figure 5:
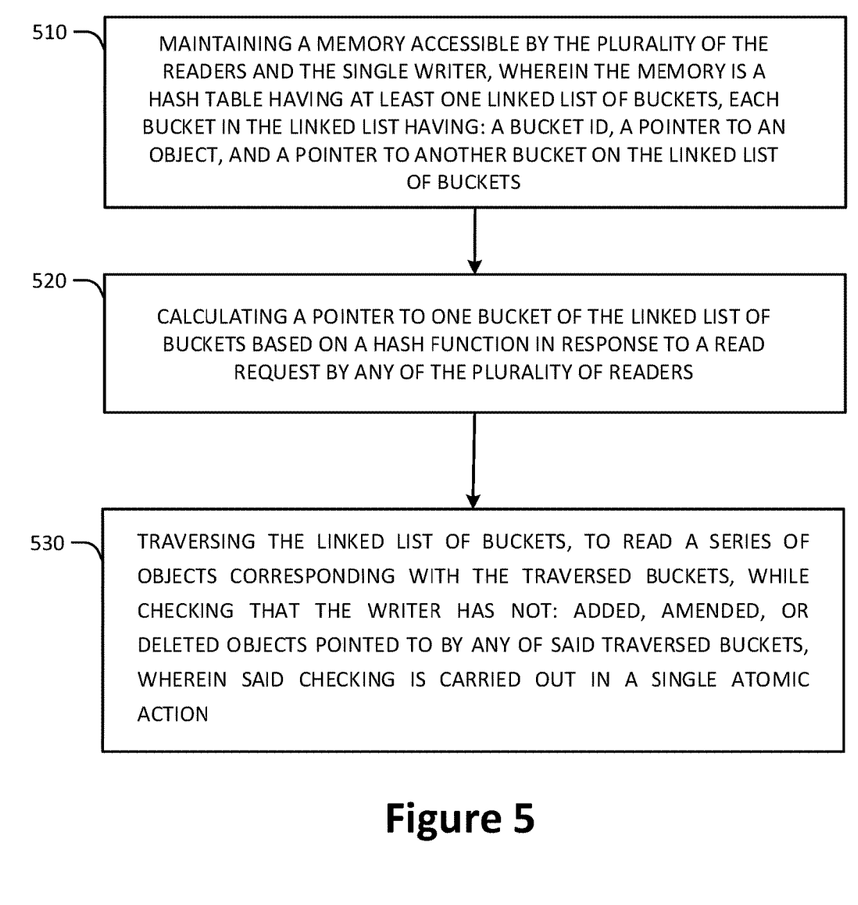
FIG. 5 is a high level flowchart diagram illustrating a method according to some embodiments of the present invention.

FIG. 5 is a flowchart diagram illustrating a method according to some embodiments of the present invention. The method according to some embodiments may include the following stages: maintaining a memory accessible by the plurality of the readers and the single writer, wherein the memory is a hash table having at least one linked list of buckets, each bucket in the linked list having: a bucket ID, a pointer to an object, and a pointer to another bucket on the linked list of buckets 510; calculating a pointer to one bucket of the linked list of buckets based on a hash function in response to a read request by any of the plurality of readers 520; and traversing the linked list of buckets, to read a series of objects corresponding with the traversed buckets, while checking that the writer has not: added, amended, or deleted objects pointed to by any of said traversed buckets, wherein said checking is carried out in a single atomic action 530.

According to some embodiments of the present invention, the checking may be carried out by examining the pointer to the next bucket which comprises an ID of next bucket and a pointer to the next bucket.

According to some embodiments of the present invention, the checking is carried out by examining the object pointer which comprises a data pointer and a data version, wherein said checking of the data version is carried out prior to retrieving the object data and right after retrieving the object data.

According to some embodiments of the present invention, in response to a request by the single writer to add a new object, the method further comprises: allocating space for object data of the new object on the shared memory; updating data version of the new object; allocating a new bucket to point the new object; and updating the pointer to a next bucket on the bucket that point to the bucket allocated for the new object, wherein the update is carried out in a single atomic action.

According to some embodiments of the present invention, in response to a request by the single writer to modify an object, the method further comprises: allocating space for object data of the modified object on the shared memory; updating data version of the modified object; and updating the object pointer on the bucket associated with the modified object, wherein the update is carried out in a single atomic action.

According to some embodiments of the present invention, in response to a request by the single writer to delete an object, the method further comprises: indicating object data of the object to be deleted as invalid; freeing space associated with the object to be deleted on the shared memory; and updating the pointer to a next bucket on the bucket that points to the bucket associated with the object to be deleted, to a pointer to a child bucket of the bucket of the object to be deleted, wherein the update is carried out in a single atomic action.

Some embodiments of the present invention may be implemented as a non-transitory computer readable medium.

In order to implement the method according to embodiments of the present invention, a computer processor may receive instructions and data from a read-only memory or a random access memory or both. At least one of aforementioned steps is performed by at least one processor associated with a computer. The essential elements of a computer are a processor for executing instructions and one or more memories for storing instructions and data. Generally, a computer may also include, or be operatively coupled to communicate with, one or more mass storage devices for storing data files. Storage modules suitable for tangibly embodying computer program instructions and data include all forms of non-volatile memory, including by way of example semiconductor memory devices, such as EPROM, EEPROM, and flash memory devices and also magneto-optic storage devices.

As may be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in base band or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or portion diagrams of methods, apparatus (systems) and computer program products according to embodiments of the invention. It may be understood that each portion of the flowchart illustrations and/or portion diagrams, and combinations of portions in the flowchart illustrations and/or portion diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram portion or portions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram portion or portions.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram portion or portions.

The aforementioned flowchart and diagrams illustrate the architecture, functionality, and operation of possible implementations of systems, methods and computer program products according to various embodiments of the present invention. In this regard, each portion in the flowchart or portion diagrams may represent a module, segment, or portion of code, which includes one or more executable instructions for implementing the specified logical function(s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved. It may also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A system for implementing a lock-free shared memory accessible by a plurality of readers and a single writer, the system comprising:
 a plurality of readers and a single writer, wherein the readers and the writer are running on a computer processor; and
 a memory accessible by a plurality of the readers and the single writer
 wherein the memory comprises a hash table having at least one linked list of buckets, each bucket in the linked list having: a bucket ID of the bucket, a pointer to an object, and a pointer to the next bucket on the linked list of buckets, the pointer to the next bucket comprising an ID for the next bucket;

wherein in response to a read request by any of the plurality of readers, the computer processor is configured to:

calculate a pointer to one bucket of the linked list of buckets based on a hash function, and traverse the linked list of buckets, to read a series of objects corresponding with the traversed buckets, while checking that the writer has not: added, amended, or deleted objects pointed to by any of said traversed buckets, wherein said checking is carried out by comparing the pointer to the next bucket and the ID of the next bucket in a single atomic action.

2. The system according to claim 1, wherein the reader retries the operation in case that the checking indicates the ID of the next bucket comprised in the pointer is not the same as the ID of the next bucket stored in the next bucket.

3. The system according to claim 1, wherein a number of buckets is limited to a maximal number of objects capable of being stored on the shared memory.

4. The system according to claim 1, wherein in response to a request by the single writer to add a new object, the computer processor is configured to:

allocate space for object data of the new object on the shared memory;

update data version of the new object;

allocate a new bucket to point the new object; and update the pointer to a next bucket on the bucket that points to the bucket allocated for the new object, wherein the update is carried out in a single atomic action.

5. The system according to claim 1, wherein in response to a request by the single writer to modify an object, the computer processor is configured to:

allocate space for object data of the modified object on the shared memory;

update data version of the modified object; and update the object pointer on the bucket associated with the modified object, wherein the update is carried out in a single atomic action.

6. The system according to claim 1, wherein in response to a request by the single writer to delete an object, the computer processor is configured to:

indicate object data of the object to be deleted as invalid;

free space associated with the object to be deleted on the shared memory; and update the pointer to a next bucket on the bucket that points to the bucket associated with the object to be deleted, to a pointer to a child bucket of the bucket of the object to be deleted, wherein the update is carried out in a single atomic action.

7. A method of implementing a lock-free shared memory accessible by a plurality of readers and a single writer, wherein the readers and the writer are running on a computer processor, the method comprising:

maintaining a memory accessible by the plurality of readers and the single writer, wherein the memory comprises a hash table having at least one linked list of buckets, each bucket in the linked list having: a bucket ID of the bucket, a pointer to an object, and a pointer to the next bucket on the linked list of buckets, the pointer to the next bucket comprising an ID for the next bucket;

calculating a pointer to one bucket of the linked list of buckets based on a hash function in response to a read request by any of the plurality of readers; and traversing the linked list of buckets, to read a series of objects corresponding with the traversed buckets, while checking that the writer has not: added, amended, or deleted objects pointed to by any of said traversed buckets, wherein said checking is carried out by comparing the pointer to the next bucket and the ID of the next bucket in a single atomic action.

8. The method according to claim 7, wherein the reader retries the operation in case that the checking indicates the ID of the next bucket comprised in the pointer is not the same as the ID of the next bucket stored in the next bucket.

9. The method according to claim 7, wherein a number of buckets is limited to a maximal number of objects capable of being stored on the shared memory.

10. The method according to claim 7, wherein in response to a request by the single writer to add a new object, the method further comprises:

allocating space for object data of the new object on the shared memory;

updating data version of the new object;

allocating a new bucket to point the new object; and updating the pointer to a next bucket on the bucket that points to the bucket allocated for the new object, wherein the update is carried out in a single atomic action.

11. The method according to claim 7, wherein in response to a request by the single writer to modify an object, the method further comprises:

allocating space for object data of the modified object on the shared memory;

updating data version of the modified object; and updating the object pointer on the bucket associated with the modified object, wherein the update is carried out in a single atomic action.

12. The method according to claim 7, wherein in response to a request by the single writer to delete an object, the method further comprises:

indicating object data of the object to be deleted as invalid;

freeing space associated with the object to be deleted on the shared memory; and updating the pointer to a next bucket on the bucket that points to the bucket associated with the object to be deleted, to a pointer to a child bucket of the bucket of the object to be deleted, wherein the update is carried out in a single atomic action.

13. A non-transitory computer readable medium for implementing a lock-free shared memory accessible by a plurality of readers and a single writer, wherein the readers and the writer are running on a computer processor, the non-transitory computer readable medium comprising a set of instructions that when executed cause at least one processor to:

maintain a memory accessible by the plurality of the readers and the single writer, wherein the memory comprises a hash table having at least one linked list of buckets, each bucket in the linked list having: a bucket ID of the bucket, a pointer to an object, and a pointer to the next bucket on the linked list of buckets, the pointer to the next bucket comprising an ID for the next bucket;

calculate a pointer to one bucket of the linked list of buckets based on a hash function in response to a read request by any of the plurality of readers, and traverse the linked list of buckets, to read a series of objects corresponding with the traversed buckets, while checking that the writer has not: added, amended, or deleted objects pointed to by any of said traversed buckets, wherein said checking is carried out by comparing the pointer to the next bucket and the ID of the next bucket in a single atomic action.

14. The non-transitory computer readable medium according to claim 13, wherein the reader retries the operation in case that the checking indicates the ID of the next bucket comprised in the pointer is not the same as the ID of the next bucket stored in the next bucket.

15. The non-transitory computer readable medium according to claim 13, wherein in response to a request by the single writer to add a new object, the non-transitory computer readable medium comprises a further a set of instructions that when executed cause at least one processor to:
   allocate space for object data of the new object on the shared memory;
   update data version of the new object;
   allocate a new bucket to point the new object; and
   update the pointer to a next bucket on the bucket that points to the bucket allocated for the new object, wherein the update is carried out in a single atomic action.

16. The non-transitory computer readable medium according to claim 13, wherein in response to a request by the single writer to add a new object, the non-transitory computer readable medium comprises a further a set of instructions that when executed cause at least one processor to:
   allocate space for object data of the modified object on the shared memory;
   updating data version of the modified object; and
   update the object pointer on the bucket associated with the modified object, wherein the update is carried out in a single atomic action.

17. The non-transitory computer readable medium according to claim 13, wherein in response to a request by the single writer to add a new object, the non-transitory computer readable medium comprises a further a set of instructions that when executed cause at least one processor to:
   indicate object data of the object to be deleted as invalid;
   freeing space associated with the object to be deleted on the shared memory; and
   update the pointer to a next bucket on the bucket that points to the bucket associated with the object to be deleted, to a pointer to a child bucket of the bucket of the object to be deleted, wherein the update is carried out in a single atomic action.

* * * * *